Jan. 22, 1935.  N. M. BAKER  1,988,536
OPHTHALMIC MOUNTING
Filed Oct. 10, 1932
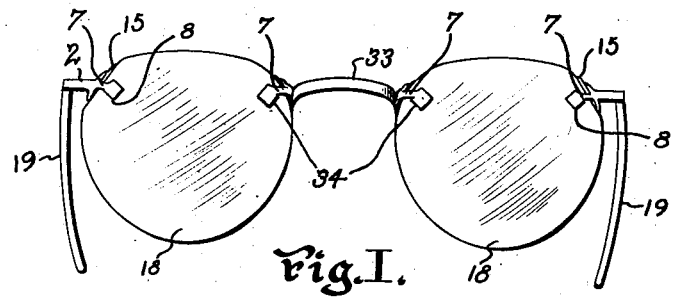
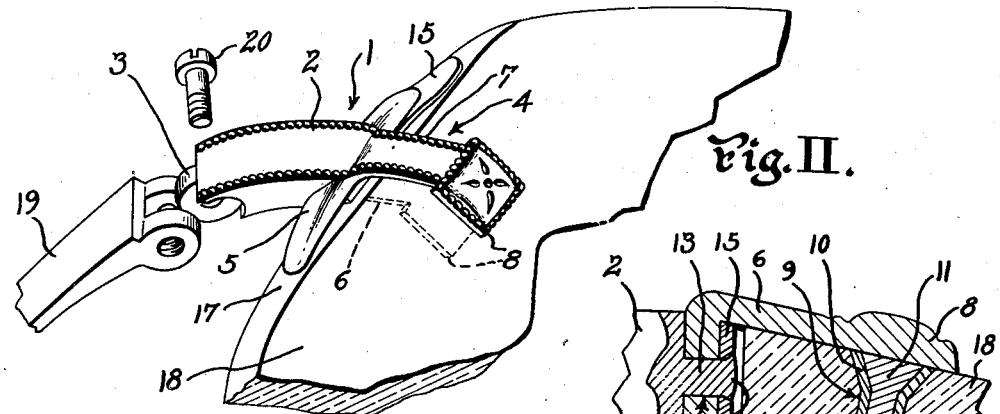
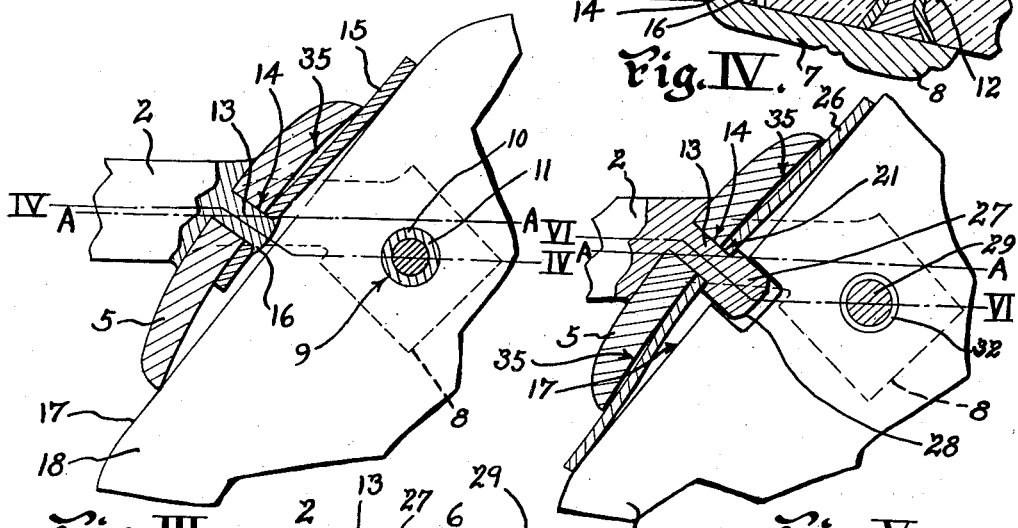
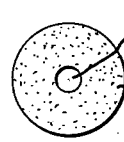
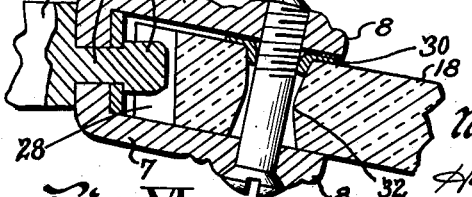
INVENTOR
Nelson M. Baker.
BY Harry H. Styll
ATTORNEY Patented Jan. 22, 1935

1,988,536

UNITED STATES PATENT OFFICE 1,988,536

OPHTHALMIC MOUNTING

Nelson M. Baker, Southbridge, Mass., assignor to American Optical Company, Southbridge, Mass., a voluntary association of Massachusetts Application October 10, 1932, Serial No. 637,092

13 Claims. (Cl. 88—47)

This invention relates to improvements in means for holding opthalmic lenses and the like and to an improved method of preparing and fitting the said lenses to the said holding means.

One of the principal objects of the invention is to provide an improved lens holding means that will resiliently ease off the rigidity of the connection of the lens to the holding means, that will insure the said holding means returning to its initial aligned position after such easing off, that will provide holding means applicable to the lenses in such a way as to give a stream line horizontal appearance across the lens connections and that will provide efficient connecting means when the edge of the connecting means adjacent the edge of the lens lies in a direction not normal to the horizontal axis of the holding means.

Another object is to provide improved means for eliminating looseness and play in the connecting means to the lens.

Another object is to provide improved cushion means for absorbing strain caused by the pressure of the connecting means on the lens.

Another object is to provide a lens strap having a relatively rigid peripheral engaging portion and a relatively resilient peripheral engaging portion, the said resilient portion being adapted to urge the relatively rigid portion into engagement with the periphery of the lens to maintain the parts in desired aligned relation with said lens.

Another object is to provide a lens connection having a part definitely shaped to produce a streamline effect horizontally across the lens in combination with means for maintaining the said part in desired relation with the lens at a point wherein its edge lies on an angle other than normal relative to its longitudinal axis.

Other objects and advantages of the invent'on will become apparent from the following description taken in connection with the accompanying drawing, and it will be understood that many changes may be made in the arrangement of parts, details of construction and methods shown and described without departing from the spirit of the invention as set forth in the accompanying claims. I, therefore, do not wish to be limited to the exact arrangement of parts, details of construction, and methods shown and described as the preferred forms only have been shown by way of illustration.

Referring to the drawing:

Fig. I is a front elevation of an ophthalmic mounting embodying the invention:

Fig. II is an enlarged fragmentary perspective view showing one of the lens connections embodying the invention.

Fig. III is an enlarged fragmentary view showing the lens connection in Fig. II partly in cross section.

Fig. IV is a section taken on line IV—IV of Fig. III.

Fig. V is a view similar to Fig. III showing a modified form of the invention.

Fig. VI is a view taken on line VI—VI of Fig. V; and

Fig. VII is a plan view of the cushion means shown in Fig. VI.

Much difficulty has been encountered in the past, in forming an opthalmic mounting having its lens strap connections to the lenses located above the useful field of vision. The angle of the edge of the lens at the location of the high connection is not normal to the horizontal meridian of the lens as has been usual in the past when said connections were located at the center line of the lens, and for this reason much difficulty has been encountered in providing a strap which may be fitted to the lens so that it will produce a desired streamline effect horizontally across the lens and at the same time be sufficiently rigid and durable to properly support the lenses before the eyes of the wearer.

Another difficulty encountered in mountings of the above nature is that of having the lens strap connections become loose and wobbly during the use of the mounting. This necessitated the constant tightening of the connecting means and in many instances in the past, in an effort to overcome the loosening, the said connecting means was tightened to such an extent that it created a pressure and strain on the lens which, during the use of the mounting caused the lens to break at said connection. Therefore, the lens strap connections in most instances were such that they were too loose to properly support the mounting on the face and when tightened to overcome this defect caused a strain and breakage of the lens.

It, therefore, is one of the primary objects of applicant's invention to provide a lens strap connection to the lens whereby the looseness and play of the connection will be eliminated, and a relatively resilient shock absorbing cushion connection with the lens will be maintained during the use of the mounting together with means for supporting the parts in desired streamline relation with each other and for preventing them from moving from said relation.

Referring more particularly to the drawing wherein like characters of reference designate like parts throughout the several views, the improved lens mount or strap 1 embodying the invention comprises a portion 2 which when viewed in front is relatively straight and which has a temple connection 3 adjacent one end thereof, and a bifurcated portion 4 adjacent the other end. The said portion 4 is formed with spaced ears 6 and 7 for engaging the faces of the lens. A portion 5 extends transversely to the straight portion 2 and intersects the longitudinal axis of said straight portion on an angle other than normal and at a point substantially at the base of the bifurcation. This portion 5 is shaped to fit the angle of the lens above the useful field of vision and to support the portions 2, 6 and 7 in a position substantially parallel with the horizontal meridian of the lens.

The ears 6 and 7 have a portion 8 projecting below the bottom line thereof and the bottom line of the relatively straight portion 2. The said portions 8, as shown in Fig. IV, are adapted to form an attaching zone for the securing device 9 which in this instance comprises a metallic tube 10 having solder means 11 therein which, after the spaced ears 6 and 7 are placed over said securing device, is adapted to be heated and allowed to cool to secure the portions 8 to the tube 10. The tube 10 extends through an opening 12 in the lens and is adapted to be spun out at its ends to fit the opening and provide positive means of securing the lens strap to the lens. Attention is directed to the fact that the center of the securing device 9, as shown in Fig. III, lies below the longitudinal axis A—A of the substantially straight portion 2 and adjoining bifurcated portion 4.

The transversely extending portion 5, as shown in Figs. II and III, is secured to the substantially straight portion 2 by means of a reduced extension 13 which extends through an opening 14 in said portion. The extension 13 is adapted to extend through an opening adjacent one end of a resilient spring section 15 which is placed between the spaced ears 6 and 7, and is spun over at 16 to secure the said spring and transverse portion 5 to the member 2. The lower portion of the transversely extending portion 5 in this instance is adapted to be adjusted to bear against the peripheral edge 17 of the lens 18 and is held in engagement with said peripheral edge through the resiliency of the member 15 which projects beyond the end of the upper portion of the member 5 and bears against the edge of the lens above said portion. The upper portion of the transversely extending portion 5 is adapted to overlie the major portion of the resilient member 15 and form a backing therefor which may be adjusted to vary the tension of the member 15 relative to the edge 17 of the lens. This provides positive means for taking up the looseness and play which may exist in the connection 9 to the lens and also provides unique means for easing off the connection and for absorbing shocks and strains on the lens during the use of the mounting. It will be apparent that by suitable adjustment of the lower portion of the member 5 that the portion 2 may be placed in any desired aligned relation with the lens, that is, the portion 2 may be adjusted about the lens connection 9 as a center to vary the angle of said portion relative to the horizontal meridian of the lens. This permits the portions 2, 6, and 7, to be placed substantially parallel with the horizontal meridian of the lens to produce a pleasing streamline effect across said lens.

A temple 19 is secured to the temple connection 3 by means of a connecting screw 20 in the usual manner.

In Figures V and VI the projection 13 on the member 2 is adapted to extend through the opening 14 in the member 5 and through an opening 21 in a blade spring member 26. The spring member 26 is adapted to bear against the peripheral edge 17 of the lens both above and below the substantially straight portion 2 and the tension thereof on the edge 17 is adapted to be controlled by adjustment of the upper and lower portions of the member 5 which engage the spring on its side opposite the lens. The projection 13 is struck to cause it to bulge at 27 and secure the blade spring 26 to the member 2 between the arms 6 and 7. The bulged portion 27 extends outwardly beyond the lens edge engaging surface of the spring 26 and is adapted to fit within a slot 28 formed in the edge 17 of the lens. The portions 8 are in this instance secured to the lens by means of a screw 29 which extends through aligned openings in said portions. The center of the said screw lying below the longitudinal axis A—A of the member 2. It will be seen that whether a tube 10 as shown in Fig. IV, or a screw 29 as shown in Fig. VI, is used the lens holding member as a whole can be moved about either the tube 10 or screw 29 as a center unless means removed from the lens holding member are provided. It will be seen by reference to Figs. III and V that the ends of the lens edge engaging portion of the holding means are nearer the edge of the lens than the center of said portion and that therefore, as the holding means is moved about the lens holding member as a center, one or the other of these ends will approach the edge of the lens and prevent this movement. The spring between the edge portion and the edge of the lens makes this retention resilient and tends to ease off shocks and jars and thus prevent breakage of the lens. In the past it has been found that where the parts are too rigidly locked, as in solder connections, there is no give nor resiliency, and the lenses readily break. The approaching ends of the edge portion of the holding means and the resiliency of the spring provide alignment of the parts with an ease-off or give that takes care of these shocks and returns the parts to alignment after displacement. A cushion pad 30 of material such as cloth, leather, rubber, or other suitable means is secured by any suitable adhesive to one of the members 6 or 7 and is adapted to lie between said member and the lens 18 to provide means for absorbing strains created by tightening the connecting screw 29. Attention is directed to the fact that the cushion member 30 is provided with a central opening 31 which is much smaller in diameter than the diameter of the screw. When the connection is assembled, the pointed end of the screw 29 is adapted to be forced through the restricted opening 31 in the cushion 30 and the movement thereof in the direction of tightening the screw causes the central portion of the pad or cushion 30 to move downwardly on the threads of the screw into the opening 32 in the lens. This causes the cushion member 30 to absorb strains both transversely of the lens and in a direction longitudinally thereof and prevents the screw from coming in direct contact with the wall of the opening 32 in the lens during the use of the mounting. The blade spring 26 which engages the peripheral edge 17 of the lens is adapted to take up the looseness and play in the screw connection to the lens and maintain a resilient pressure on said peripheral edge to absorb shocks and strains during the use of the mounting. The projection 27 into the slot 28 in the lens locks the said relatively straight portion 2, and spaced portions 6 and 7 in desired aligned relation with the lens and prevents movement of said members about the connecting screw as a center.

It is to be understood that although applicant has shown and described only two means of securing the lens strap to the lens applicant may use any desired means such as cements or other adhesives in combination with various different slot or groove arrangements or may secure the strap to the lens by clamping or other means.

The improved lens mount or strap 1 is shown embodied in a rimless type mounting which comprises the usual lenses 18 connected by a bridge member 33 and having the usual temples or sides 19 for supporting the mounting on the face of the wearer. The ends of the bridge 33 are shown attached to the lenses 18 by the lens mounts or straps 34 above the useful field of vision to produce a streamline effect across the lenses. Attention is directed to the straight portions 6 and 7 of the lens mounts or straps 1 and 34. These straight portions lie in a plane substantially parallel with the horizontal meridian of the lens and are adapted to attract the attention of the observer's eye and direct it in said horizontal plane across the lenses. This produces a pleasing streamline effect which is lost if the angle of these positions are changed.

The structure shown in Figures II and III illustrates a separate spring member 15 extending outwardly of one end of the member 5 for resiliently urging the opposite end into engagement with the edge 17 of the lens. Although a separate spring member 15 is shown and described it is to be understood that one end of the member 5 may be formed resilient and the other relatively rigid and adjustable if desired or the both portions may be made resilient. It also is to be understood that the edge 17 may be any shape desired, that is, convex, concave, or straight.

The spring 15 as illustrated in Fig. III extends outwardly beyond the upper end of the portion 5 and provides an increased resilient edge bearing surface above the connection 9. The downwardly extending portions 8 are provided to permit the placing of the screw connection 29 or solder connection 9 below the longitudinal axis of the portions 2, 6, and 7 to aid in increasing the bearing surface of the edge engaging member above the portion 2.

Attention is directed to the fact that the relatively rigid lower edge engaging portion 5 and the projection and slot members 27 and 28 perform a similar function of supporting and maintaining the portions 2, 6 and 7 in a position wherein the longitudinal axes of said members lie substantially parallel with the horizontal meridian of the lens. The above supporting means function in combination with resilient shock absorbing connections to the lens and provide means of controlling the angle of the portions 2, 6 and 7 relative to the lens. The spring members 15 and 26 are adapted to move to a spaced relation with the members 5 and lens edge 17, as indicated at the points 35, to permit free flexible movement of said springs in either direction when in use. Attention is also directed to the fact that the spring 15 may be placed either above or below the member 2 and that the part 5 may be a separate member or may be integral with the bifurcated portion 4 if desired.

The following is the procedure in preparing the lenses and in fitting the same to the lens holding means:

The fitting of lenses to their mountings, and adjusting these mountings to the facial requirements of the wearer is a difficult, expert, and important procedure in the dispensing of eyeglasses and spectacles to the wearer. This work is performed by highly trained and developed members of a profession that requires a technical education as well as experience, this skill being recognized in many states by licensing laws. An eyeglass or spectacle lens if not properly mounted in its mounting, or if improperly mounted before the eye of the patient, may injure the eyesight instead of aiding the same. This is particularly true in the case of lenses having compound prescriptions, including prismatic, cylindrical or other compound combinations.

In fitting the applicant's mounting the lens is first surfaced to the prescriptive requirements of the patient. Its optical axis and prescriptive elements are then located and laid out upon the lens. The shape of the lens is then carefully laid out in relation to the optical properties of the lens and at the same time a special shaped seat is provided for the mounting. The lens is then placed in a lens cutter and carefully cut to shape. It is then placed in an edging machine and carefully edged to shape. This locating and fixing the lens seat is a very important procedure, requiring expert skill and accuracy as the lens must be shaped about a predetermined center and the connecting zone thereon formed in such a position as to support the lens in accurate prescriptive relation to the eye. The lens holding means or strap is then fitted to the special seat and to the surfaces of the lens by bending the edge and surface engaging portions to the shapes required. The location of the connecting opening in the lens is then determined, marked, and drilled at the desired distance from the edge of the seat.

The strap is then again fitted to the seat, and in the case of the screw connection to the lens, is adjusted to obtain exact alignment of the strap connecting openings with the opening in the lens. The connecting screw is then inserted in the aligned openings and the mounting checked for alignment of parts, and tried to determine the tension relative to the edge of the lens. If the parts are not in proper relation the screw is removed, the final altering adjustments made, and the mounting then permanently secured in fixed relation with the lens.

If it is desired to provide means for relieving clamp strain on the lens, a cushion member 30 is secured to one of the inner faces of the lens engaging members 8 by cement or otherwise prior to the final securing of the mounting to the lens. This provides means between the strap and the lens for relieving any clamp strain set up by the connecting screw. If the structure shown in Fig. III is used, the tension of the spring is next adjusted by bending the portions 5 either toward or away from the edge of the lens, as required. The lower peripheral engaging portion 5 is adapted to control the position of parts through its adjusted relation with the edge of the lens, and the top peripheral portion 5 is adapted to regulate the tension of the spring by the variation of its adjusted pressure on the spring.

If the structure shown in Fig. V is used, the slot 28 is cut in the edge of the lens at the lens seat. It is apparent that great care must be taken to secure accurate location and alignment of the parts in this arrangement to prevent breaking of the lens. The bending of the portions 5 in this construction merely varies the tension of the spring relative to the edge of the lens.

In regulating the tension of the peripheral engaging spring member 15 or 26 in either case, care must be taken that the spring is so positioned that it is free to flex in either direction, that is, towards or away from the edge of the lens. This result is obtained by adjusting the portions 5 so that they bear adjacent their free ends against the spring. This causes the underlying portions of the spring to move to a spaced relation with the lens edge and with the inner surface of the members 5, as illustrated at 35 in the drawing. This provides resilient means for absorbing shocks and strains and for eliminating looseness and play in the connecting means on the lens.

In the assembling of the solder structure shown in Fig. IV it is necessary after the parts have been tried and fitted to the lens, as set forth above in the description of the screw connection, to insert the tube 10 in the opening 12 in the lens and spin the ends of said tube outwardly to engage the beveled walls of the lens internally of the opening. This is to fix the said tube in the opening. The solder is then placed in the tube. The strap is positioned on the lens with the portions 8 thereof overlying the tube and solder and is held in said position while the parts are heated and allowed to cool. This causes the solder to flow and harden and unite the parts in their aligned relation with each other. In all instances the finished mounting should be accurately fitted to the face of the wearer prior to its use. This fitting is very important and should be performed by a person skilled in the art. The lenses must be located in their prescribed relation with the eyes and the mounting in general must be in balanced relation with the face of the wearer. The supporting face engaging parts of the mounting must also be adjusted so that they will not cut in the flesh and hurt during the use of the mounting.

It is quite apparent, therefore, that the complete procedure of forming and fitting mountings of this character to the face of the wearer requires a great amount of skill, and that each and every step of forming and fitting the parts must be accurately performed. It is well known that the lenses of an ophthalmic mounting must be supported in their prescribed positions before the eyes, particularly lenses having prismatic or cylindrical corrections which require true axial relation with the eyes, or lenses of the bifocal or trifocal type having different focal fields which must be placed in accurate relation with the eyes. These lenses are very expensive and great care must be taken that they are not broken during the forming or fitting of the mounting. An error in any of the steps of the process of preparing the lens for the holding means or in fitting the said holding means to the lens may render the said lens unusable or may cause the breakage and necessary replacement thereof.

The device embodying the invention provides novel means of overcoming most of the difficulties and defects encountered in the prior art types of high attachments to lenses, it provides novel means of obtaining accurate alignment of parts and of easing off strains at the connections to the lens, it provides novel means of accurately locating and fitting the parts to the lens to produce a streamline effect across said lens, it is rigid and durable in structure and provides novel adjustable means for varying the relation of the strap on the lens and for regulating the tension of the resilient bearing means relative to the edge of the lens.

From the foregoing description it will be seen that I have provided simple, efficient, and economical means and methods of obtaining all of the objects and advantages of the invention.

Having described my invention I claim:

1. In a device of the character described means for attaching a lens comprising an arm portion having a lens engaging portion to engage the face of the lens and a portion to engage the edge of the lens, a spring member extending from a point adjacent the longitudinal center of the edge portion beyond the outer end thereof on one side only, said spring lying between the edge portion and the edge of the lens, the end of the edge portion bearing on the spring being nearer the edge of the lens than the center of said edge portion, means connecting the lens engaging portion to the lens, said end of the edge portion bearing on the spring being adapted to compress the spring against the edge of the lens at said end when the attaching means is moved about the lens attaching means as a center so as to move said end towards the lens.

2. In a device of the character described means for attaching a lens comprising an arm portion having a lens engaging portion to engage the face of the lens and a portion to engage the edge of the lens, a spring member extending from a point adjacent the longitudinal center of the edge portion beyond the outer end thereof on one side only, said spring lying between the edge portion and the edge of the lens, the end of the edge portion bearing on the spring being nearer the edge of the lens than the center of said edge portion, means connecting the lens engaging portion to the lens, said end of the edge portion bearing on the spring being adapted to compress the spring against the edge of the lens at said end when the attaching means is moved about the lens attaching means as a center so as to move said end towards the lens, and the other end of the edge portion bearing against the edge of the lens, said end portion being adjustable by bending to fit it against the edge of the lens.

3. In a device of the character described means for attaching a lens comprising an arm portion having a lens engaging portion to engage the face of the lens and a portion to engage the edge of the lens, a spring member lying between the edge portion and the edge of the lens and extending from a point adjacent the center of the edge portion beyond one end thereof on one side only, the end of the edge portion bearing on the spring being nearer the edge of the lens than the center of said portion, means connecting the lens engaging portion to the lens and an interengaging connection between the spring and the edge portion adjacent the center of said edge portion, said end of the edge portion bearing on the spring being adapted to compress the spring against the edge of the lens at said end when the attaching means is moved about the lens attaching means as a center so as to move said end towards the edge of the lens.

In a device of the character described means for attaching a lens comprising an arm portion having a lens engaging portion to engage the face of the lens and a portion to engage the edge of the lens, a spring member lying between the edge portion and the edge of the lens and extending from a point adjacent the center of the edge portion beyond one end thereof on one side only, the end of the edge portion bearing on the spring being nearer the edge of the lens than the center of said portion, means connecting the lens engaging portion to the lens and an interengaging connection between the spring and the edge portion adjacent the center of said edge portion, said end of the edge portion bearing on the spring being adapted to compress the spring against the edge of the lens at said end when the attaching means is moved about the lens attaching means as a center so as to move said end towards the edge of the lens, and the other end of the edge portion bearing against the edge of the lens, said end portion being adjustable by bending to fit it against the edge of the lens.

5. The method of fitting a lens to its holding means comprising shaping the edge of a lens to adapt the lens to the lens edge portion of the holding means, securing a spring member between the edge portion of the holding means and the edge of the lens, so that said spring extends from only a point adjacent the center of the edge portion of the holding means to a point beyond one end thereof, said end being nearer the edge of the lens than the center of the edge portion, compressing the spring against the edge of the seat, securing the holding means to the lens in said position, and then bending the other end of the edge portion of the holding means to engage the edge of the lens to retain the aligned position of the holding means and lens, whereby the parts will be resiliently held in said alignment.

6. The method of fitting a lens to its holding means comprising shaping the edge of a lens to adapt the lens to the lens edge portion of the holding means, securing a spring member between the edge portion of the holding means and the edge of the lens, so that said spring extends only from a point adjacent the center of the edge portion of the holding means to a point beyond one end thereof, said end being nearer the edge of the lens than the center of the edge portion, bending the edge engaging portion of the holding means to obtain required tension on the spring, compressing the spring against the edge of the seat, securing the holding means to the lens in said position, and then bending the other end of the edge portion of the holding means to engage the edge of the lens to retain the aligned position of the holding means and lens, whereby the parts will be resiliently held in said alignment.

7. The method of fitting a lens to its holding means comprising shaping the edge of the lens to the lens edge portion of the holding means, making a recess in the lens for the lens securing means, placing a spring member between the edge of the lens and the edge portion of the holding means and securing the spring to the holding means adjacent the center of its edge portion, tensing the spring to required tension by bending the end of the edge portion of the holding means, compressing the spring against the edge of the lens and securing a lens securing member in the recess of the lens and to the holding means so the holding means can be moved as a whole about the lens securing means as a center, and the holding means held in resilient alignment with the lens by the said spring.

8. In a device of the character described, means for attaching a lens comprising an arm portion having a lens engaging portion to engage the face of the lens, and a portion to engage the edge thereof, a lens securing member extending into the lens and retained by the face engaging portion of the attaching means whereby the attaching means may be moved about the lens securing means as a center, a spring member extending between the edge of the lens and the edge engaging portion of the attaching means and secured thereto adjacent the center of said edge engaging portion by a member having a portion extending loosely into the edge of the lens, and the ends of said edge engaging portion being nearer the edge of the lens than the center thereof, whereby an end of the edge engaging portion will compress the spring against the edge of the lens when the attaching means is moved about the lens securing member as a center and the portion of the spring securing means extending into the edge of the lens holds the attaching means in alignment with the lens within the limits permitted by the looseness of the fitting between said parts and the spring will tend to resiliently maintain the alignment of said attaching means and lens.

9. The method of fitting a lens to its holding means comprising shaping the edge of the lens to the edge contour desired, making a recess in the lens at a predetermined position relative to its edge for the lens securing means, fitting holding means having an edge portion and a spring member associated therewith on the lens with the spring member between the edge of the lens and the edge portion of the holding means and tensing the spring to required tension by bending the end of the edge portion of said holding means, pressing the holding means to compress the spring against the edge of the lens and securing a lens securing member in the recess of the lens integrally to the holding means when the spring is compressed so that the said holding means and lens securing member can be moved as a whole about the lens securing means as a center against the action of the spring and be resiliently held in alignment with the lens by said spring.

10. The method of fitting a lens to its holding means comprising shaping the edge of the lens to the lens edge portion of the holding means, making a recess in the lens for lens securing means, placing a spring member between the edge of the lens and the edge portion of the holding means and securing the spring to the holding means, tensing the spring to required tension by bending the end of the edge portion of the holding means, compressing the spring against the edge of the lens and securing weldedly a lens securing member in the recess of the lens so it may not be removed therefrom without fracture, so the holding means can be moved as a whole about the lens securing means as a center, and the holding means held in resilient alignment with the lens by the said spring.

11. In a device of the character described, means for holding a perforated lens comprising a lens holding member having means to engage the face of the lens and having a portion spaced from the edge of the lens to provide a clearance therefrom, connecting means forming a pivotal connection through the perforation in the lens, solder means securing said connecting means in place therein in related position with the lens holding means so that said connecting means cannot be removed without destroying the solder connection so said lens may be moved rotatably on said connecting means because of said clearance, said solder means being the sole securing means, and resilient means associated with said lens holding means and lens to resiliently control the rotative movement of the lens on said connecting means in the perforation thereof to hold the parts in required aligned position.

12. The method of fitting a lens to its holding means comprising shaping the edge of the lens to the edge contour desired, making a recess in the lens at a predetermined position relative to its edge for the lens securing means, fitting holding means having a spring member and a backing member for said spring member associated therewith on the lens with the spring member between the edge of the lens and the backing member, setting the position of the spring member, pressing the holding means to compress the spring against the edge of the lens between the backing member and said edge and securing a lens securing member in the recess of the lens in related position to the holding means by integrally welding said member in said position when the spring is compressed so that the lens may be moved about the lens securing member as a center against the action of the spring and be resiliently held in alignment with the lens by said spring.

13. In a device of the character described, means for holding a perforated lens comprising a lens holding member having means to engage the face of the lens and having a portion spaced from the edge of the lens to provide a clearance therefrom, connecting means forming a pivotal connection through the perforation in the lens, solder means securing said connecting means in place therein in related position with the lens holding means so that said connecting means cannot be removed without destroying the solder connection so said lens may be moved rotatably on said connecting means because of said clearance, said connecting means forming a wall between the solder means and lens to confine the solder to said connecting means and said solder means being the sole securing means, and resilient means associated with said lens holding means and lens to resiliently control the rotative movement of the lens on said connecting means in the perforation thereof to hold the parts in required aligned position.

NELSON M. BAKER.